L. HILL.
Assignor, by direct and mesne assignments, to T. C. BATES.
CORSET STEEL FASTENING.
No. 10,596. Reissued May 12, 1885.
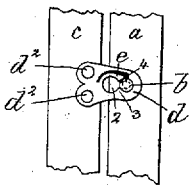
Witnesses.
John F. C. Grimsleth
Eva L. Emery.
Inventor.
Lucian Hill
by Lemby & Gregory
Attys
N. PETERS, Photo-Lithographer, Washington, D. C.

UNITED STATES PATENT OFFICE.

LUCIAN HILL, OF NORTH BROOKFIELD, MASS., ASSIGNOR, BY DIRECT AND MESNE ASSIGNMENTS, TO THEODORE C. BATES, OF SAME PLACE.

CORSET-STEEL FASTENING.

SPECIFICATION forming part of Reissued Letters Patent No. 10,596, dated May 12, 1885.

Original No. 225,375, dated March 9, 1880. Application for reissue filed March 28, 1885.

*To all whom it may concern:*

Be it known that I, LUCIAN HILL, of North Brookfield, county of Worcester, State of Massachusetts, have invented an Improvement in Corset-Steel Fastenings, of which the following description, in connection with the accompanying drawing, is a specification.

This invention relates to fastenings for corset-steels, and is an improvement on the class of fastening shown in patent to Hill, dated December 9, 1879.

In this invention I provide the usual fastening eye-plate, made a little larger than usual, with a hook made integral therewith, the said hook being adapted to be struck by the usual stud connected with the other steel as the two steels at the front of the corset joined by the eye-plate and stud move slightly apart. This sheet-metal hook has a nose, which, when struck by the stud in its outward movement in the slot of the plate, causes the hook to yield laterally to the direction of movement of the stud, and as soon as the stud passes the said nose the hook springs back into its normal position and checks the backward movement of the stud into the large part of the slot of the eye-plate until the stress of the hook is again overcome.

In the patent referred to the fastening was made of wire; but in this my invention the fastening device is made of thin sheet metal, and an extra rivet by which to attach the fastening device to the steel is not needed.

My invention consists in the combination, with a fastening eye piece or plate, of a sheet-metal hook made integral therewith, and having a nose adapted to extend into or across the path of movement of the stud which enters the eye-piece, the said hook yielding laterally to the length of the eye in the eye-plate to permit the passage of the stud, and preventing its return until the stress of the the hook is again overcome by forcing the stud backward past it. This sheet-metal fastening is stiffer than the wire fastening, and may be struck out by a die at very small cost.

The drawing represents in front view a portion of two usual steels with my improved fastening applied thereto.

The steel *a* and stud *b* and steel *c* may be of any usual kind.

The eye-plate *d*, attached to the steel *c* by the usual two rivets, $d^2$ $d^2$, has an eye part, 2, to receive the head of the stud *b*, and leading from the said eye 2 toward the outer end of the eye-plate is a slot, 3, along which the shank of the stud *b* traverses after the same has been inserted through the eye 2.

To prevent the unhooking of the eye-plate from the stud, except by considerable force, and thereby to prevent accidental unhooking, is the aim of my invention. This I accomplish by combining with the said eye-plate a sheet-metal fastening, *e*, (shown as a hook made integral therewith,) and having a nose, 4, the said nose being properly beveled, and in its normal condition standing across the slot 3, or forming an impediment therein, against which the shank of the stud strikes when being moved to the end of the slot most remote from that steel to which the said eye-plate is attached, the stud occupying a position at that end of the said slot when the corset is distended and fastened. The stud in its outward movement strikes the said nose and the hook is sprung back, the stress of the spring metal being overcome, and having passed the said nose the hook springs back, enabling the nose to occupy a position in the said slot at the rear of the stud *b*, where it acts as an impediment to the return of the stud into the eye 2.

This sheet-metal fastening yields in a direction laterally to the movement of the stud along the slot 3.

I claim—

In a corset-steel fastening, the eye-plate provided with an eye, 2, and a slot, 3, leading therefrom, and with a connected hook integral therewith, and having a nose to spring laterally across the slot 3 when the stud is moved therein in one direction in the slot, the spring falling behind the stud to thereby impede its return along the said slot, substantially as described.

In testimony whereof I have signed my name to this specification in the presence of two subscribing witnesses.

LUCIAN HILL.

Witnesses:
HERBERT L. ADAMS,
BENJ. L. SAMPSON.